(12) United States Patent
Zabkar, Jr.

(10) Patent No.: US 12,220,009 B2
(45) Date of Patent: Feb. 11, 2025

(54) GLOVE HAVING AT LEAST ONE RADAR DETECTABLE MARK

(71) Applicant: Acushnet Company, Fairhaven, MA (US)

(72) Inventor: Donald F. Zabkar, Jr., Newport, RI (US)

(73) Assignee: Acushnet Company, Fairhaven, MA (US)

( * ) Notice: Subject to any disclaimer, the term of this patent is extended or adjusted under 35 U.S.C. 154(b) by 624 days.

(21) Appl. No.: 17/516,018

(22) Filed: Nov. 1, 2021

(65) Prior Publication Data

US 2023/0133521 A1    May 4, 2023

(51) Int. Cl.
| | | |
|---|---|---|
| *A41D 19/00* | (2006.01) | |
| *A63B 69/36* | (2006.01) | |
| *A63B 71/14* | (2006.01) | |

(52) U.S. Cl.
CPC ..... *A41D 19/0024* (2013.01); *A41D 19/0006* (2013.01)

(58) Field of Classification Search
CPC ........... A41D 19/0024; A41D 19/0006; A41D 19/0027; A41D 19/0157; A63B 2209/00; A63B 2209/10; A63B 2220/89; A63B 71/146; G06F 2218/08; G06F 2218/12
See application file for complete search history.

(56) References Cited

U.S. PATENT DOCUMENTS

| | | | |
|---|---|---|---|
| 5,738,104 A * | 4/1998 | Lo | A61B 5/681 |
| | | | 600/509 |
| 2013/0211594 A1 | 8/2013 | Stephens, Jr. | |
| 2013/0276206 A1* | 10/2013 | DuChene | A41D 19/0048 |
| | | | 2/161.4 |
| 2015/0309563 A1* | 10/2015 | Connor | A61B 5/1071 |
| | | | 73/865.4 |
| 2016/0232807 A1* | 8/2016 | Ghaffari | A61B 5/1118 |
| 2017/0312614 A1* | 11/2017 | Tran | G06F 3/00 |
| 2018/0356559 A1* | 12/2018 | Ruskin | G01V 3/12 |

* cited by examiner

*Primary Examiner* — Nini F Legesse

(57) ABSTRACT

Gloves including one or more layers having at least one radar detectable mark disposed on the surface thereof are provided.

21 Claims, 8 Drawing Sheets

GLOVE HAVING AT LEAST ONE RADAR DETECTABLE MARK

FIELD OF THE INVENTION

The present invention relates generally to gloves including a mark, or a plurality of marks, for improving the detection and tracking thereof by radar systems. Such gloves are particularly useful in providing golf swing analysis and golf club fitting data.

BACKGROUND OF THE INVENTION

Interest continues to increase in golf experiences which require a system for detecting golf glove movement throughout the golf swing. Radar tracking systems that are currently used for detecting golf balls are particularly adaptable to provide useful data if the golf glove movement throughout the golf swing can be detected.

Currently, radar reflective stickers are commonly used on golf balls in order to determine the launch conditions, i.e., spin, speed and launch angle, with radar tracking systems. Radar reflective stickers are typically placed on the outer surface of the golf ball in order for radar tracking systems to obtain launch condition data. Radar devices also attempt to obtain golf club data during the impact with a golf ball. However, there is nothing that allows for the radar tracking devices to capture swing data.

Thus, there is a need for a glove that provides one or more of the following benefits: improved quality of golf swing data collected by radar tracking systems, especially in limited travel distance environments, and enhanced experience for the end users of these radar tracking systems.

SUMMARY OF THE INVENTION

The present invention is directed to a glove comprising at least one layer with a mark, or a plurality of marks, disposed on a surface thereof.

In a particular embodiment, the mark has a continuous shape and is formed from a radar detectable material. In a particular aspect of this embodiment, a golf glove has one or more of the following properties:
  a) the mark has a non-circular shape;
  b) the radar detectable material is an electrically conductive ink comprising a base resin and an electrically conductive material, wherein the base resin is optionally selected from the group consisting of vinyl polymers, urethane polymers, acrylic polymers, epoxy polymers, silicone polymers and combinations of two or more thereof, and wherein the electrically conductive material is optionally selected from the group consisting of silver, electrically conductive carbon, aluminum, graphene, nanotubes, nanometals, and combinations of two or more thereof;
  b) the mark has a resistivity of from 0.1 Ohms to 2,500 Ohms;
  c) the mark has dimensions such that every 0.025 inch wide path longitudinally up the glove on the back of the golfer's hand, intersects the mark;
  d) the mark has dimensions such that every 0.025 inch wide circumferential path around the glove on the golfer's hand, between the wrist and the knuckles, intersects the mark;
  e) the golf glove comprises a layer and the mark is disposed on an inner surface of the layer or an outer surface of the layer; and
  f) the golf glove comprises an inner layer and an outer layer, and the mark is disposed between the inner layer and the outer layer.

In another particular embodiment, a mark is formed from a radar detectable material and has a first portion on a palm side of the glove and a second portion on a back side of the glove. In yet another particular embodiment, the mark is formed from a radar detectable material and has a continuous shape comprising three or more intersecting stripes at least partially disposed on the palm side of the glove and the back side of the glove.

In still another particular embodiment, the at least one layer of the glove has a plurality of radar detectable marks disposed on a surface thereof. In a particular aspect of this embodiment, the radar detectable marks have a resistivity of from 0.1 Ohms to 25 Ohms. In another particular aspect of this embodiment, every radar detectable mark is covered by an outer layer such that the mark is not visible to the user.

In another particular aspect of this embodiment, the plurality of radar detectable marks includes a first mark on a palm side of the glove and a second mark on the back side of the glove. In a preferred embodiment, the first mark has a continuous shape and the second mark has a basic shape selected from basic nonpolygonal shapes, regular polygons, and irregular polygons. In a preferred embodiment, the second mark has a continuous shape and the first mark has a basic shape selected from basic nonpolygonal shapes, regular polygons, and irregular polygons. Non-limiting examples of suitable continuous shapes include lines and arcs. Non-limiting examples of suitable basic nonpolygonal shapes include circles, rings, and crescents. Non-limiting examples of suitable regular polygons include squares and equilateral triangles. Non-limiting examples of suitable irregular polygons include rectangles, non-equilateral triangles, and chevrons.

In another particular embodiment, a plurality of radar detectable marks includes a first mark and a second mark, wherein the first mark has a continuous, irregular shape comprising a plurality of intersecting stripes, and the second mark has an irregular shape that is different from the first mark. In another particular aspect of this embodiment, the plurality of radar detectable marks includes a third mark, the third mark having either an irregular shape or a regular shape.

In another particular aspect of this invention, all of the radar detectable marks have a total surface coverage of from 1% to 20% of the gloves outer surface.

In another particular embodiment, the golf glove comprises at least one portion having two or more layers, wherein an inner layer has one or more radar detectable marks disposed on an outer surface thereof which is covered by an outer layer or on an inner surface of the outer layer.

It is also contemplated that an embodiment of the present invention can include a plurality of dots located on the back portion of finger portions. The dots would be preferably between about 0.05 inch and 0.5 inch in diameter and can be the same or different diameters.

In a preferred embodiment, the glove includes a radar detectable mark for a radar detector located such that is facing the user. In another preferred embodiment, the glove includes a radar detectable mark for a radar detector located overhead. In yet another preferred embodiment, the glove includes a radar detectable mark for a radar detector located behind the user. In still another preferred embodiment, the glove includes a radar detectable mark for a plurality of radar detectors.

In a preferred embodiment, the glove includes a radar detectable mark and can be used in conjunction with a golf ball with a radar detectable mark such as that disclosed in U.S. Application No. 63/212,225, which is hereby incorporated by reference in its entirety.

BRIEF DESCRIPTION OF THE DRAWINGS

In the accompanying drawings, which form a part of the specification and are to be read in conjunction therewith, and in which like reference numerals are used to indicate like parts in the various views.

DETAILED DESCRIPTION

Figure 1:
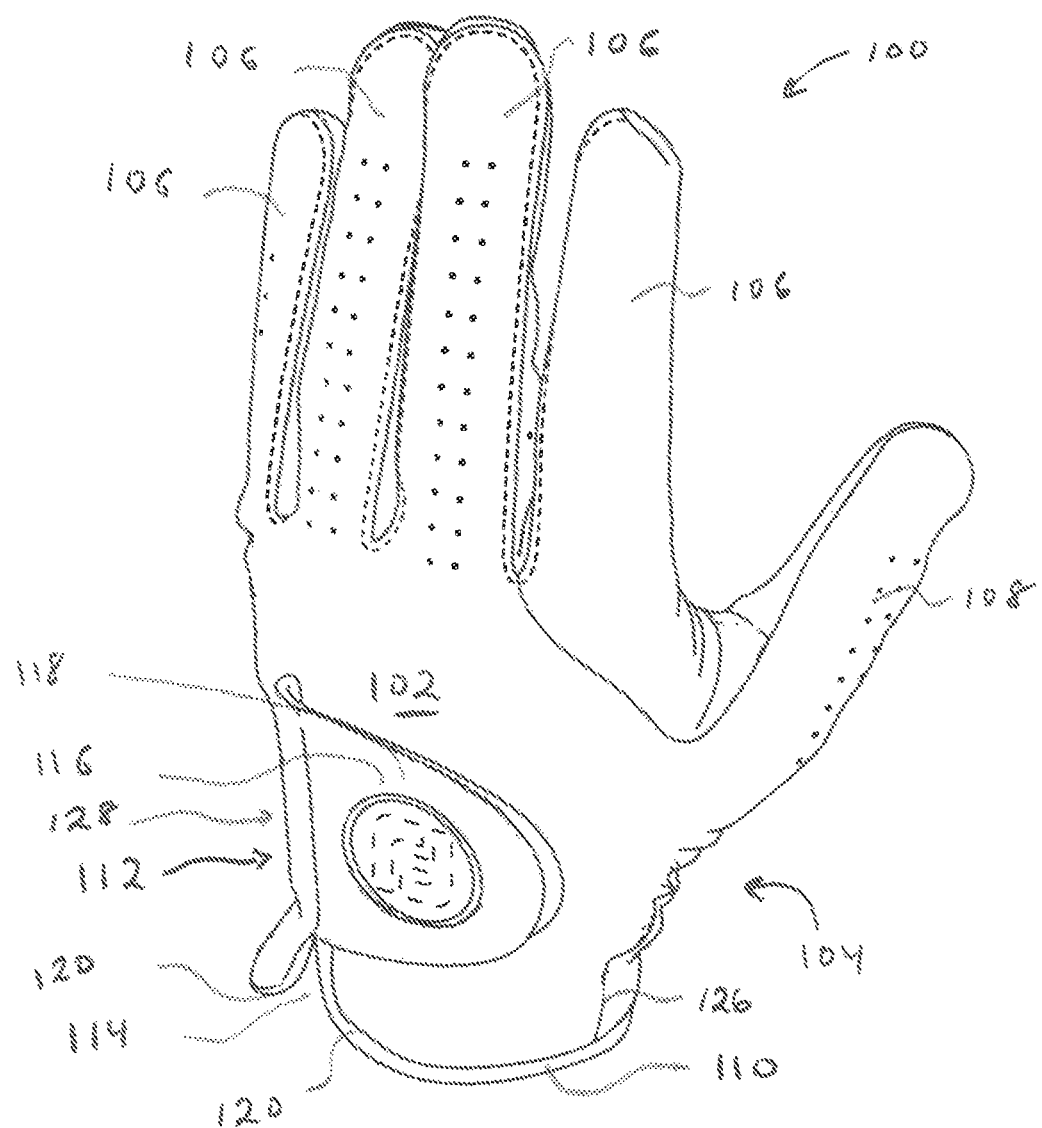
FIG. 1 illustrates a back, perspective view of a glove according to an embodiment of the present invention.

Golf gloves of the present invention include one or more layers which have at least one radar detectable mark disposed on a surface thereof. Particularly suitable radar detectable materials for forming the mark include, but are not limited to, electrically conductive inks comprising a base resin and an electrically conductive material. The ink may be water-borne or solvent-borne. The ink may be a 1-component or 2-component ink. The ink may be cured with an isocyanate-based curing agent, UV cure, and/or thermal cure. The ink and the mark formed therefrom may be transparent or opaque. In a particular embodiment, the base resin of the ink is selected from the group consisting of vinyl polymers, urethane polymers, acrylic polymers, epoxy polymers, silicone polymers and combinations of two or more thereof. In another particular embodiment, the electrically conductive material of the ink is selected from the group consisting of silver, conductive carbon, aluminum, graphene, nanotubes, nanometals, and combinations of two or more thereof. Particularly suitable inks are those capable of producing a mark having a resistivity of between about 0.1 Ohms and 2,500 Ohms, and preferably between 0.5 Ohms and 25 Ohms, and most preferably, between about 5 Ohms and 20 Ohms. Non-limiting examples of suitable commercially available inks are Ink Lab 303 silver conductive ink, commercially available from ITW Trans Tech; silver inks, conductive carbon inks, aluminum inks, silver/carbon blend inks, and aluminum/carbon blend inks, commercially available from Creative Materials Inc. In embodiments of the present invention wherein the golf glove includes more than one radar detectable mark on a layer, the radar detectable material used to form one mark may be the same as or different from the radar detectable material used to form another mark. In embodiments of the present invention wherein the golf glove includes at least two layers having one or more radar detectable marks disposed therebetween, the radar detectable material used to form a mark on one layer may be the same as or different from the radar detectable material used to form a mark on another layer.

Radar detectable material is applied to the surface of a layer using any suitable technique. In a particular embodiment, a mark is formed by applying radar detectable material to a surface of a golf glove layer by pad printing. In a particular aspect of this embodiment, the pad printed mark has a film thickness of at least 0.5 μm and a film thickness of 5 μm or less. Preferably the mark has a film thickness within a range 0.5 μm and 5 μm.

The surface on which one or more radar detectable marks are disposed can be any surface of any portion of a golf glove. While the invention is not meant to be limited to the placement of one or more marks, golf gloves of the present invention are designed to allow for the optional placement of radar detectable marks on a surface other than the outer surface of the glove because it is beneficial to some golfers to be able to obtain reliable data using a golf glove that looks the same on the outside as a conventional golf glove. Thus, in a particular embodiment, one or more radar detectable marks are disposed on any surface other than the outermost surface. For example, the radar detectable marks may be applied to an outer surface of the leather or synthetic leather that forms the glove such that the radar detectable mark does not contact the skin of the user. Moreover, the radar detectable marks are preferably located in areas that can have a second layer disposed over the marks. In a preferrable embodiment, the glove is comprised of a hook and loop closure mechanism. The hook or loop layer can be located as an outside layer of the closure, away from the hand surface, and the radar detectable mark can be placed on an outside surface of the outside closure layer. The radar detectable mark can then be covered by a logo surface or the like such that the radar detectable mark is not visible to the user.

In yet another embodiment, a radar detectable mark is located on the outer surface of the glove leather at a location that can then be covered by a decorative member made of natural or synthetic material.

For purposes of the present disclosure, a mark is considered to be disposed on the surface of a layer regardless of whether a coating has previously been applied to the surface. In other words, if an adhesive coating is applied to a surface of a layer, and a mark is then applied on top of the adhesive coating, the mark is considered to be disposed on the surface of the layer, even though an adhesive coating is present therebetween. Likewise, if a coating is present between two layers of the glove, the layers are still considered to be adjacent to each other, even though a coating may be present therebetween.

In a particular embodiment, golf gloves of the invention include an adhesive coating applied to a layer on which at least one radar detectable mark is disposed, before and/or after application of the mark(s) onto the layer. In a particular aspect of this embodiment, at least one mark is disposed on a surface of a golf glove closure layer and an adhesive coating is applied to the layer and on top of the mark(s).

Each radar detectable mark has a shape selected from a variety of suitable shapes, including regular shapes and irregular shapes. Suitable examples of regular shapes include, but are not limited to, circles, rings, crescents, squares, triangles, rectangles, chevrons, and other regular polygons, irregular polygons, and basic nonpolygonal shapes. Suitable examples of irregular shapes include, but are not limited to, intersecting shapes, including, but not limited to, a series of intersecting stripes, wherein the length and width of each stripe within the series of intersecting stripes may be different than or substantially the same as that of the other stripe(s) within the series. For purposes of the present disclosure, stripes have substantially the same length and/or width if their respective lengths and/or widths differ by no more than 10%.

In a particular embodiment, the golf glove includes at least one radar detectable mark having an irregular shape defined by a series of intersecting rectangular stripes. In a particular aspect of this embodiment, the mark having an irregular shape additionally has one or more of the following properties:

a) the series of intersecting stripes consists of two rectangular stripes, or the series of intersecting stripes consists of three rectangular stripes, or the series of intersecting stripes comprises at least four rectangular stripes;

b) the series of intersecting stripes includes a first stripe and a second stripe, and the first and second stripes are substantially equal in length;
   (i) a plane bisecting the first stripe and a plane bisecting the second stripe are separated by an angle of between about 60° and 150° and more preferably between about 75° and 1105°;
   (ii) the first and second stripes are substantially equal in width; and
   (iii) the first and second stripes have a length of between about 0.5 inches and 5 inches and more preferably between about 1.0 and 2.5 inches; and
   (iv) the series of intersecting stripes additionally includes a third stripe and a fourth stripe, and a plane bisecting the third stripe and a plane bisecting the fourth stripe are separated by an angle of between about 30° and 150° or more preferably between about 60° and 120°;

c) each of the stripes within the series of intersecting stripes has a width of 0.2 inches or less and a width of 0.03 inches or greater. Preferably the intersecting stripes have a width of from 0.05 inches to 0.15 inches;

d) the series of stripes includes a first stripe, a second stripe, and a third stripe, each of the first and second stripes having a length of between about 1.5 and 3.0 inches and the third stripe having a length of from 0.1 inches to 0.5 inches; and e) the series of stripes includes a first stripe, a second stripe, a third stripe, and a fourth stripe, the fourth stripe having a length that is less than that of the first and second stripes and greater than that of the third stripe.

Referring to FIG. 1, a glove 100 is preferably comprised of a back portion 102 that covers a back portion of a user's hand, a palm portion 104 that covers a palm portion of a user's hand, finger portions 106 that cover one or more of the fingers of a user's hand, a thumb portion 108 that covers the thumb of a user's hand, a cuff portion 110 that surrounds a substantial portion of a user's wrist and a closure mechanism 112. The closure mechanism 112 extends across a slit 114 that extends from the cuff portion 110 toward the finger portions 106.

The wearer places one hand into the glove 100 and uses the other hand to grasp the flap 116 and pull it over the slit 114. Then, the flap 116 is fastened to the opposing section of the glove back portion 102 to tighten and secure the glove 100 on the wearer's hand. Preferably, hook-and-loop fasteners such as Velcro® fasteners are used to lock the flap 116 in place. More particularly, the flap 116 has an outer surface 118 and interior (not shown) surface. Tiny hook/loop fasteners are arranged on the interior surface of the flap 116 and complementary hook/loop fasteners are arranged on the opposing section of the back portion 102 of the glove 100. When the flap 116 is pulled over the slit 114, it is releasably attached to the opposing portion of the back portion 102 of the glove 100 by mating the complementary hook/loop fasteners together. The wearer of the glove may release the flap 116 by simply pulling on it in an upward direction, and then his/her hand may be removed easily. It is recognized that other closure systems (for example, snap-on buttons, ties, buttons/button holes, buckles, elastics, and the like) may be used in addition to or in place of a hook/loop fastening system.

In this embodiment, the detectable mark 120 is comprised of one or more stripes located on the cuff portion 110. Preferably, the detectable mark 120 extends at least from the closure mechanism 112 to at least the edge portions 126 (on the thumb side) and 128 (on the pinky side) on both sides of the slit 114 such that every 0.025 inch wide path longitudinally up the glove on the back of the golfer's hand intersects the mark. In this configuration, the detectable mark 120 is preferably applied on the material forming the cuff portion 110 prior to the cuff portion being folded and sewn to the remainder of the glove 100 such that the detectable mark 120 is located on the inside surface of the cuff portion 110 and is not visible to a user wearing the glove 100.

Figure 2:
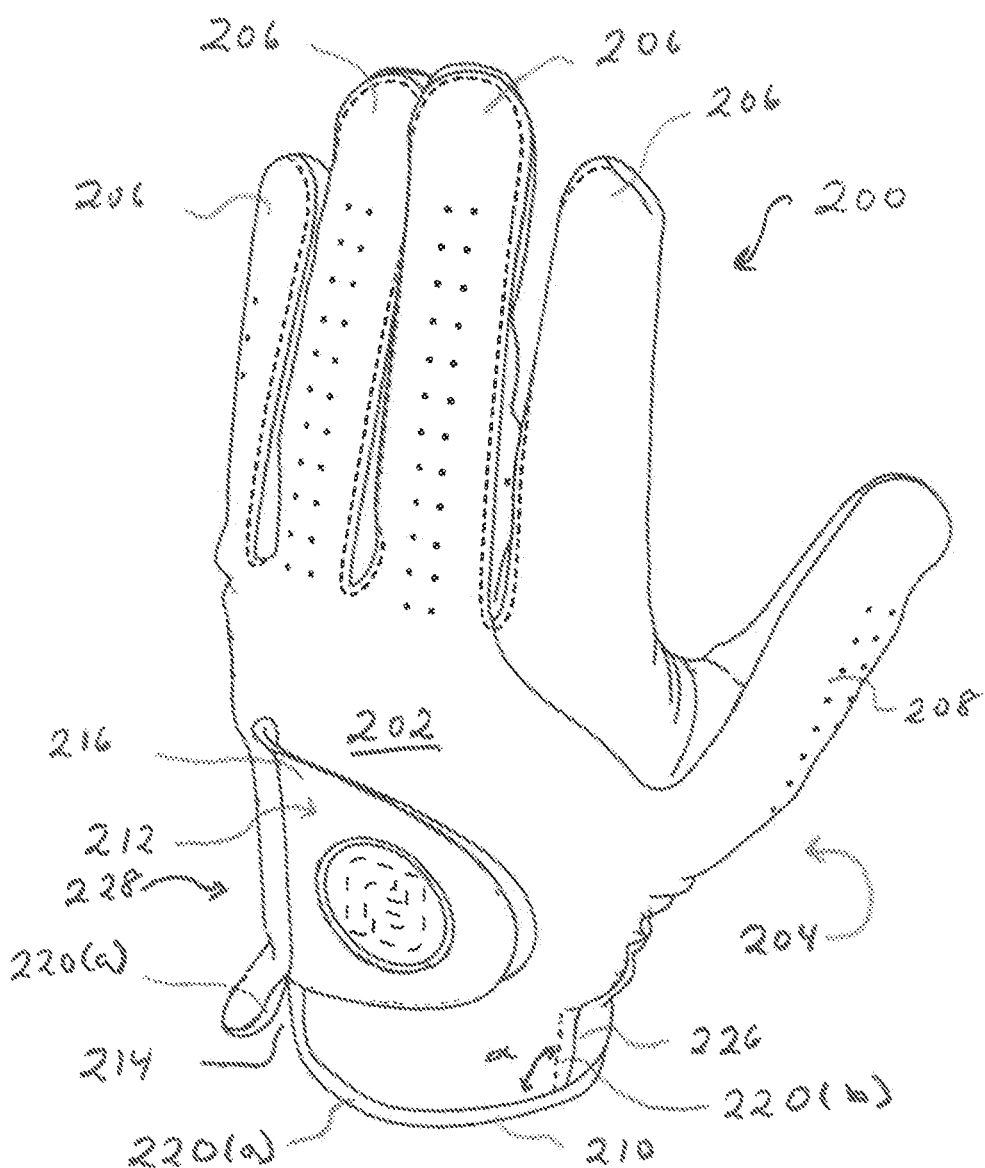
FIG. 2 illustrates a back, perspective view of a glove according to an embodiment of the present invention.

Referring to FIG. 2, a glove 200 is preferably comprised of a back portion 202 that covers a back portion of a user's hand, a palm portion 204 that covers a palm portion of a user's hand, finger portions 206 that cover one or more of the fingers of a user's hand, a thumb portion 208 that covers the thumb of a user's hand, a cuff portion 210 that surrounds a substantial portion of a user's wrist and a closure mechanism 212. The closure mechanism 212 extends across a slit 214 that extends from the cuff portion 210 toward the finger portions 206.

In this embodiment, the detectable mark 220(a) and 220(b) is comprised of two or more stripes located on the cuff portion 210 and along an edge portion 216 (as shown) or 228. Preferably, the detectable mark 220(a) extends at least from the closure mechanism 212 to at least the edge portions 226 and 228 on both sides of the slit 214 such that every 0.025 inch wide path longitudinally up the glove on the back of the golfer's hand intersects the mark 220(a). A second portion of the detectable mark 220(b) is preferably located at the edge portion 216 or 228 and intersects the detectable mark 220(a) at an angle α of between 30° and 120°, and more preferably at about 90°. Thus, the second portion of the detectable mark 220(b) can assist a radar detector to determine the orientation of the user's hand throughout the swing. Preferably, the second portion of the detectable mark 220(b) has a length of at least 0.5 inches and more preferably between about 0.5 inches and 3 inches. In this configuration, the detectable mark 220(a) is preferably applied on the material forming the cuff portion 210 prior to the cuff portion being folded and sewn to the remainder of the glove 200 such that the detectable mark 220 is located on the inside surface of the cuff portion 210 and is not visible to a user wearing the glove 200. Similarly, the second portion of the detectable mark 220(b) is preferably applied to an inside surface of the glove 200 such that it is not visible to the user, and more preferably a portion of the palm material or other material covers the detectable mark 220(b) on the inside of the glove 200 such that the detectable mark 220(b) does not touch the user's hand when the glove 200 is worn.

Figure 3:
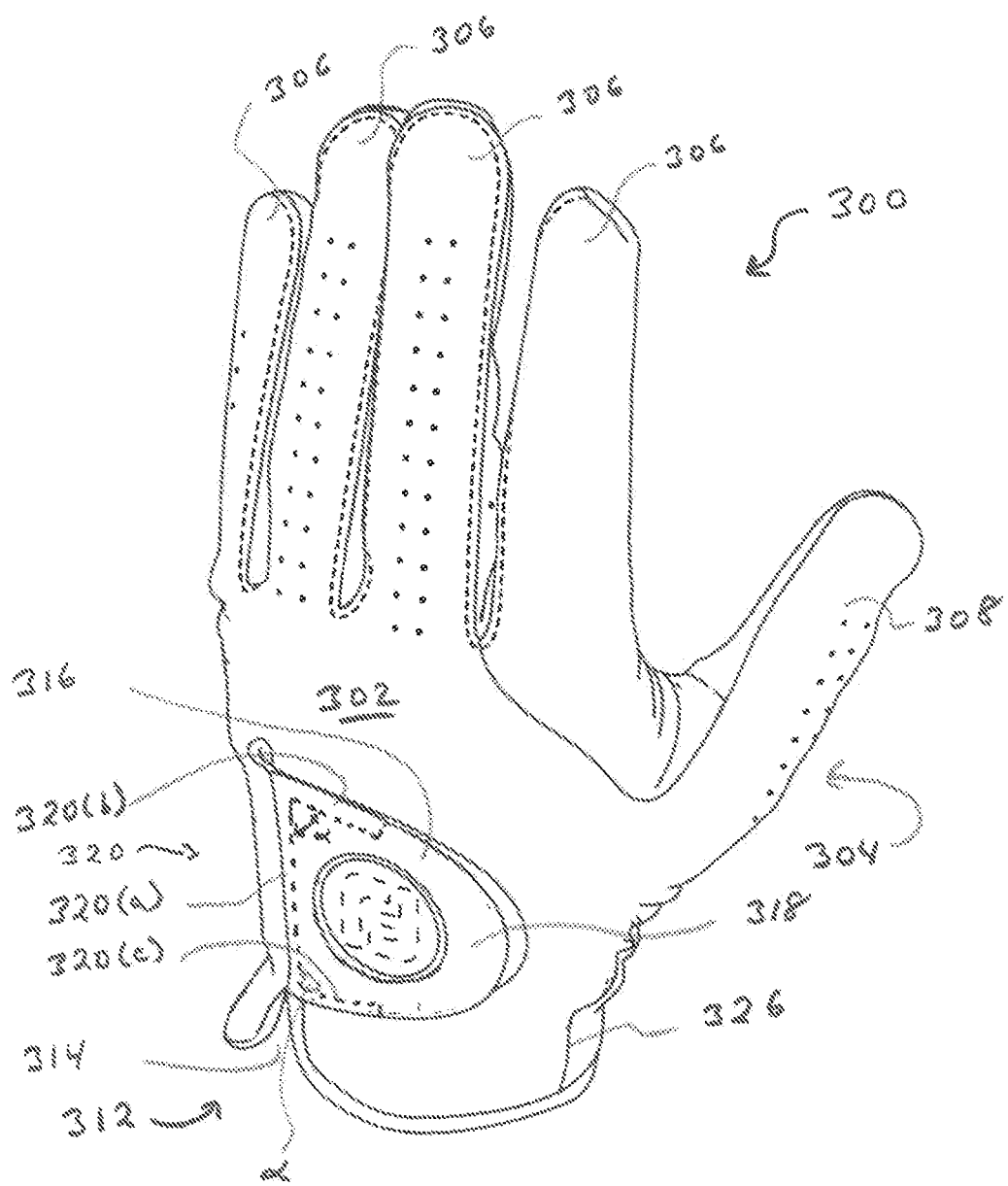
FIG. 3 illustrates a back, perspective view of a glove according to an embodiment of the present invention.

Referring to FIG. 3, a glove 300 is preferably comprised of a back portion 302 that covers a back portion of a user's hand, a palm portion 304 that covers a palm portion of a user's hand, finger portions 306 that cover one or more of the fingers of a user's hand, a thumb portion 308 that covers the thumb of a user's hand, a cuff portion 310 that surrounds a substantial portion of a user's wrist and a closure mechanism 312. The closure mechanism 312 extends across a slit 314 that extends from the cuff portion 310 toward the finger portions 306 and includes a flap 316 that closes the slit 314. When closed, the flap 316 is fastened to the opposing section of the glove back portion 302 to tighten and secure the glove 300 on the wearer's hand. Preferably, hook-and-loop fasteners such as Velcro® fasteners are used to lock the flap 316 in place. More particularly, the flap 316 has an outer surface 318 and interior (not shown) surface. Tiny hook/loop fasteners are arranged on the interior surface of the flap 316 and complementary hook/loop fasteners are arranged on the opposing section of the back portion 302 of the glove 300.

In this embodiment, the detectable mark 320 is comprised of a plurality of stripes 320(a), 320(b) and 320(c) located in the closure mechanism 312. Preferably, the detectable mark 320 is applied between the hook/fastener layer on the flap 316 and the outer surface 318 of the flap 316 such that the detectable mark 320 is not visible to the wearer. Stripe 320(a) extends along a back edge portion of the flap 316 and stripes 320(b) and 320(c) extend along the top portion and bottom portions of the flap 316, respectively. Preferably, stripes 320(b) and 320(c) intersect stripe 320(a) at an angle α of between 30° and 120°, and more preferably, between 75° and 105°. Each of the stripes 320(a), 320(b) and 320(c) are preferably about 0.5 inch and 2.5 inches, and more preferably, between about 1 inch and 2 inches. In a preferred embodiment, each of the stripes 320(a), 320(b) and 320(c) have a different length in order to assist a radar detector to determine the orientation of the user's hand throughout the swing.

Figure 4:
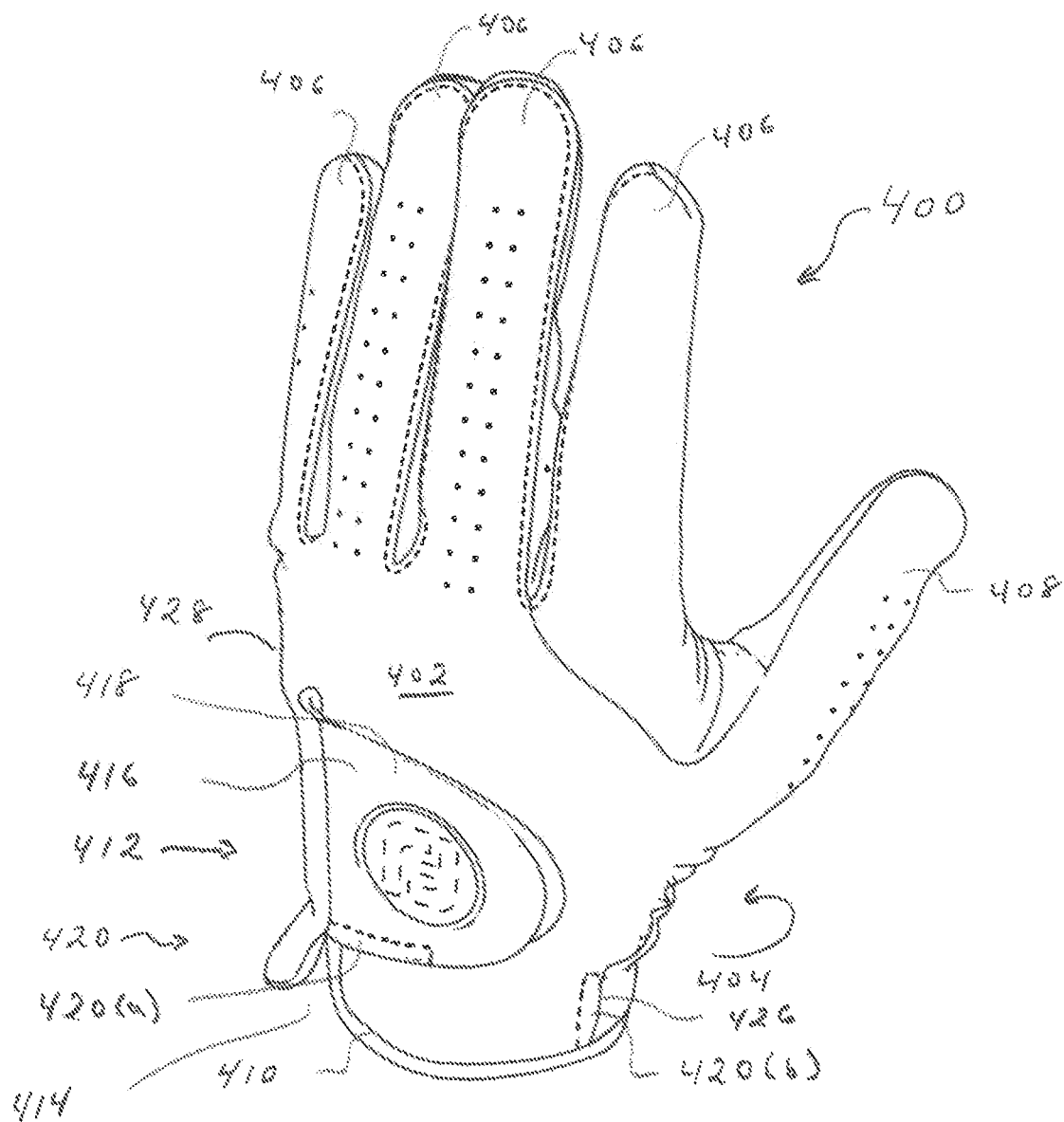
FIG. 4 illustrates a back, perspective view of a glove according to an embodiment of the present invention.

Referring to FIG. 4, a glove 400 is preferably comprised of a back portion 402 that covers a back portion of a user's hand, a palm portion 404 that covers a palm portion of a user's hand, finger portions 406 that cover one or more of the fingers of a user's hand, a thumb portion 408 that covers the thumb of a user's hand, a cuff portion 410 that surrounds a substantial portion of a user's wrist and a closure mechanism 412. The closure mechanism 412 extends across a slit 414 that extends from the cuff portion 410 toward the finger portions 406 and includes a flap 416 that closes the slit 414. When closed, the flap 416 is fastened to the opposing section of the glove back portion 402 to tighten and secure the glove 400 on the wearer's hand. Preferably, hook-and-loop fasteners such as Velcro® fasteners are used to lock the flap 416 in place. More particularly, the flap 416 has an outer surface 418 and interior (not shown) surface. Tiny hook/loop fasteners are arranged on the interior surface of the flap 416 and complementary hook/loop fasteners are arranged on the opposing section of the back portion 402 of the glove 400.

In this embodiment, the detectable mark 420 is comprised of a plurality of stripes 420(a) and 420(b) located in the closure mechanism 412 and along the least one of the edge portions 426 (on the thumb side) and 428 (on the pinky side), respectively. Preferably, the detectable mark 320(a) is applied between the hook/fastener layer on the flap 416 and the outer surface 418 of the flap 416 such that the detectable mark 420(a) is not visible to the wearer. Preferably, stripe 320(a) extends along a back edge portion of the flap 416 or extends along the top portion or bottom portion (as shown) of the flap 416. Preferably, stripe 420(b) of the detectable mark 420 is preferably applied to an inside surface of the glove 400 such that it is not visible to the user, and more preferably, a portion of the palm material or other material covers the stripe 420(b) on the inside of the glove 400 such that the detectable mark 420 does not touch the user's hand when the glove 400 is worn. In this embodiment, stripe 420(a) does not intersect stripe 420(b). However, extensions of the stripes 420(a) and 420(b) would intersect at an angle α of between 30° and 120°, and more preferably, between 75° and 105°. Each of the stripes 420(a) and 420(b) are preferably about 0.5 inch and 2.5 inches, and more preferably, between about 1 inch and 2 inches. In a preferred embodiment, each of the stripes 420(a) and 420(b) have a different length in order to assist a radar detector to determine the orientation of the user's hand throughout the swing.

Figure 5:
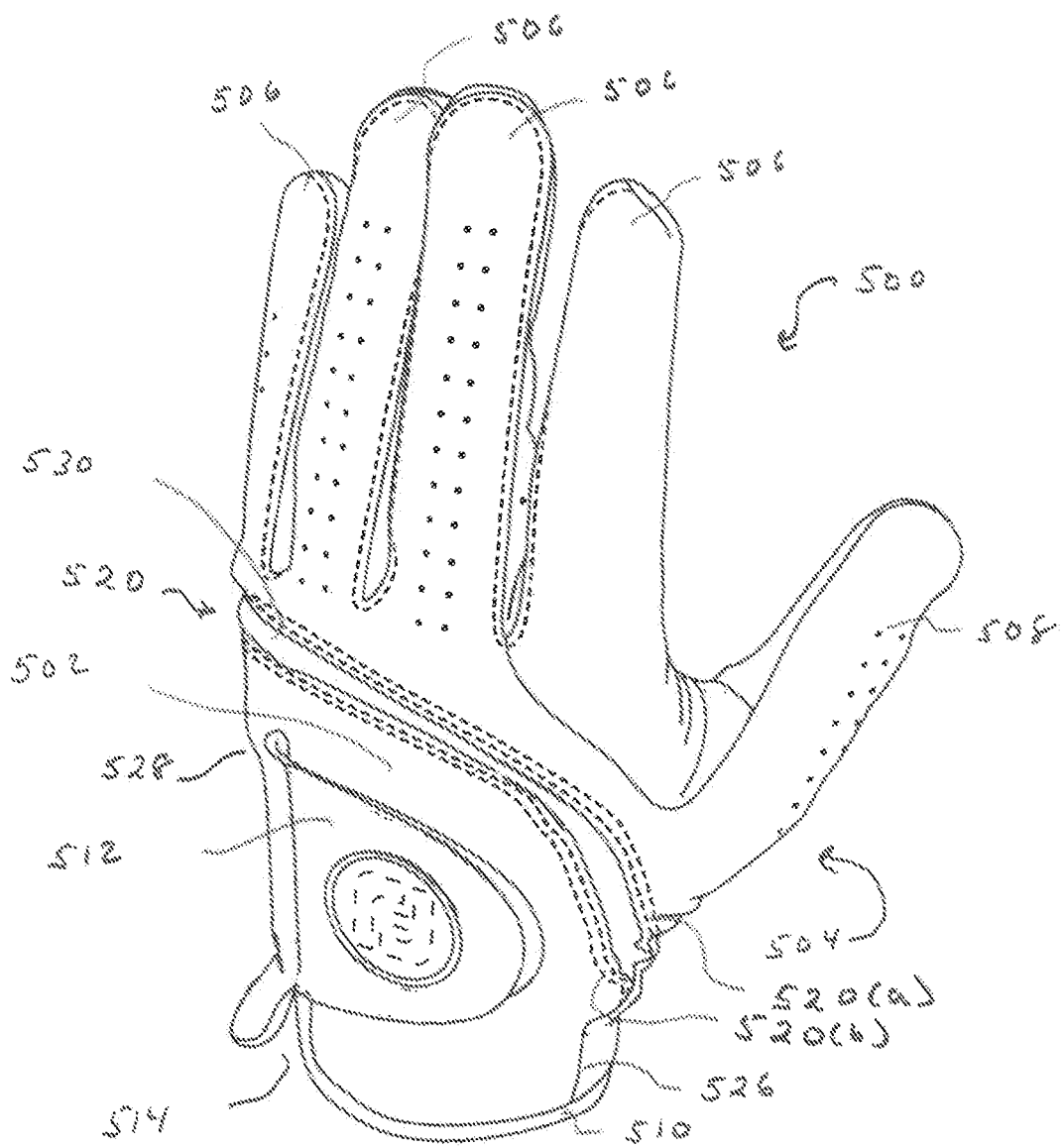
FIG. 5 illustrates a back, perspective view of a glove according to an embodiment of the present invention.

Referring to FIG. 5, a glove 500 is preferably comprised of a back portion 502 that covers a back portion of a user's hand, a palm portion 504 that covers a palm portion of a user's hand, finger portions 506 that cover one or more of the fingers of a user's hand, a thumb portion 508 that covers the thumb of a user's hand, a cuff portion 510 that surrounds a substantial portion of a user's wrist and a closure mechanism 512. The closure mechanism 512 extends across a slit 514 that extends from the cuff portion 510 toward the finger portions 506 and includes a flap 516 that closes the slit 514. When closed, the flap 516 is fastened to the opposing section of the glove back portion 502 to tighten and secure the glove 500 on the wearer's hand. Preferably, hook-and-loop fasteners such as Velcro® fasteners are used to lock the flap 516 in place. Tiny hook/loop fasteners are arranged on the interior surface of the flap 516 and complementary hook/loop fasteners are arranged on the opposing section of the back portion 502 of the glove 500.

In this embodiment, the detectable mark 520 is comprised of a plurality of stripes 520(a) and 520(b) located across the back portion 502 of glove 500. Preferably, the detectable mark 520 is applied such that every 0.025 inch wide path longitudinally up the glove on the back of the golfer's hand intersects the mark 520. More preferably, the detectable mark 520 is comprised of more than one stripe 520(a) and 520(b) that similar in length but spaced apart from each other by at least 0.1 inch in order to assist a radar detector to determine the orientation of the user's hand throughout the swing. Moreover, the detectable mark 520 is preferably applied to an inside surface of the glove 500 such that it is not visible to the user. In a preferred embodiment, the glove 500 may include an elastic strip 530 that extends from the thumb side edge 526 to the pinky side edge 528. The detectable mark 520 can be applied to the inside surface of the glove back portion 502, adjacent to the elastic strip 530 such that the elastic strip can cover the inside surface of the detectable mark and prevent it from touching the user's hand. As shown, stripes 520(a) and 520(b) extend along the top edge and bottom edge of the elastic strip, respectively. Each of the stripes 520(a) and 520(b) have a length of about 1 inch and 6 inches. The stripes 520(a) and 520(b) can be continuous or can be sectioned into a plurality of smaller stripes and can alternate with each other in order to assist the radar detector in determining the orientation of the glove.

Figure 6:
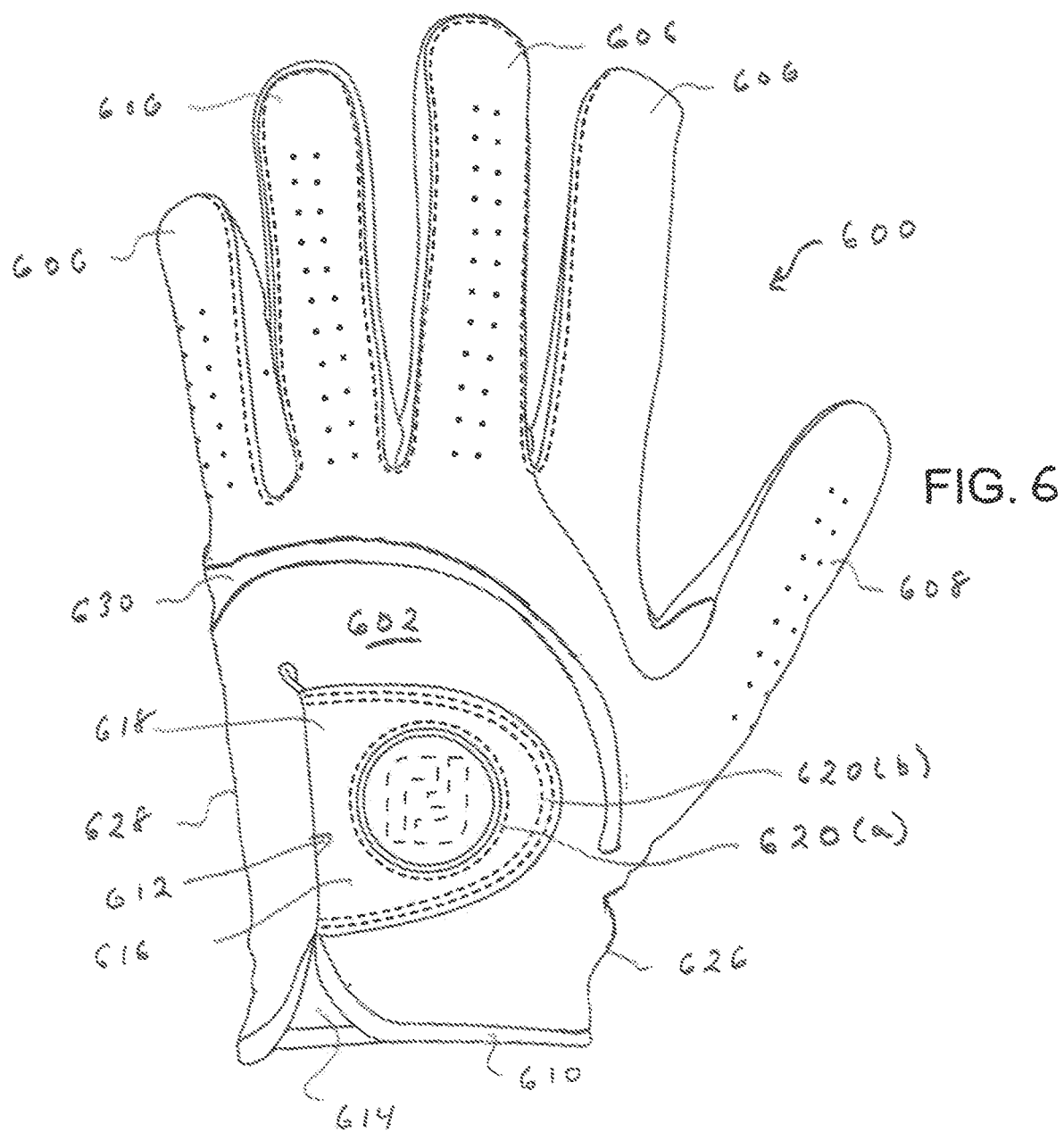
FIG. 6 illustrates a back view of a glove according to an embodiment of the present invention.

Referring to FIG. 6, a glove 600 is preferably comprised of a back portion 602 that covers a back portion of a user's hand, a palm portion (not shown) that covers a palm portion of a user's hand, finger portions 606 that cover one or more of the fingers of a user's hand, a thumb portion 608 that covers the thumb of a user's hand, a cuff portion 610 that surrounds a substantial portion of a user's wrist and a closure mechanism 612. The closure mechanism 612 extends across a slit 614 that extends from the cuff portion 610 toward the finger portions 606 and includes a flap 616 that closes the slit 614. When closed, the flap 616 is fastened to the opposing section of the glove back portion 602 to tighten and secure the glove 600 on the wearer's hand. Preferably, hook-and-loop fasteners such as Velcro® fasteners are used to lock the flap 616 in place. More particularly, the flap 616 has an outer surface 618 and interior (not shown) surfaces. Tiny hook/loop fasteners are arranged on the interior surface of the flap 616 and complementary hook/loop fasteners are arranged on the opposing section of the back portion 602 of the glove 600.

In this embodiment, the detectable mark 620 is comprised of a plurality of stripes 620(a) and 620(b) located in the closure mechanism 612. Preferably, the detectable mark 620 is applied between the hook/fastener layer on the flap 616 and the outer surface 618 of the flap 616 such that the detectable mark 620 is not visible to the wearer. Stripe 620(a) preferably extends in a circular shape around a logo on the flap 616 and stipes 620(b) is an arcuate shape that extends around the periphery of the flap 612. In this embodiment, stripes 620(a) and 620(b) do not intersect. Each of the stripes 620(a) and 620(b) are preferably about 1 inch and 5 inches, and more preferably, between about 1 inch and 4 inches.

Figure 7:
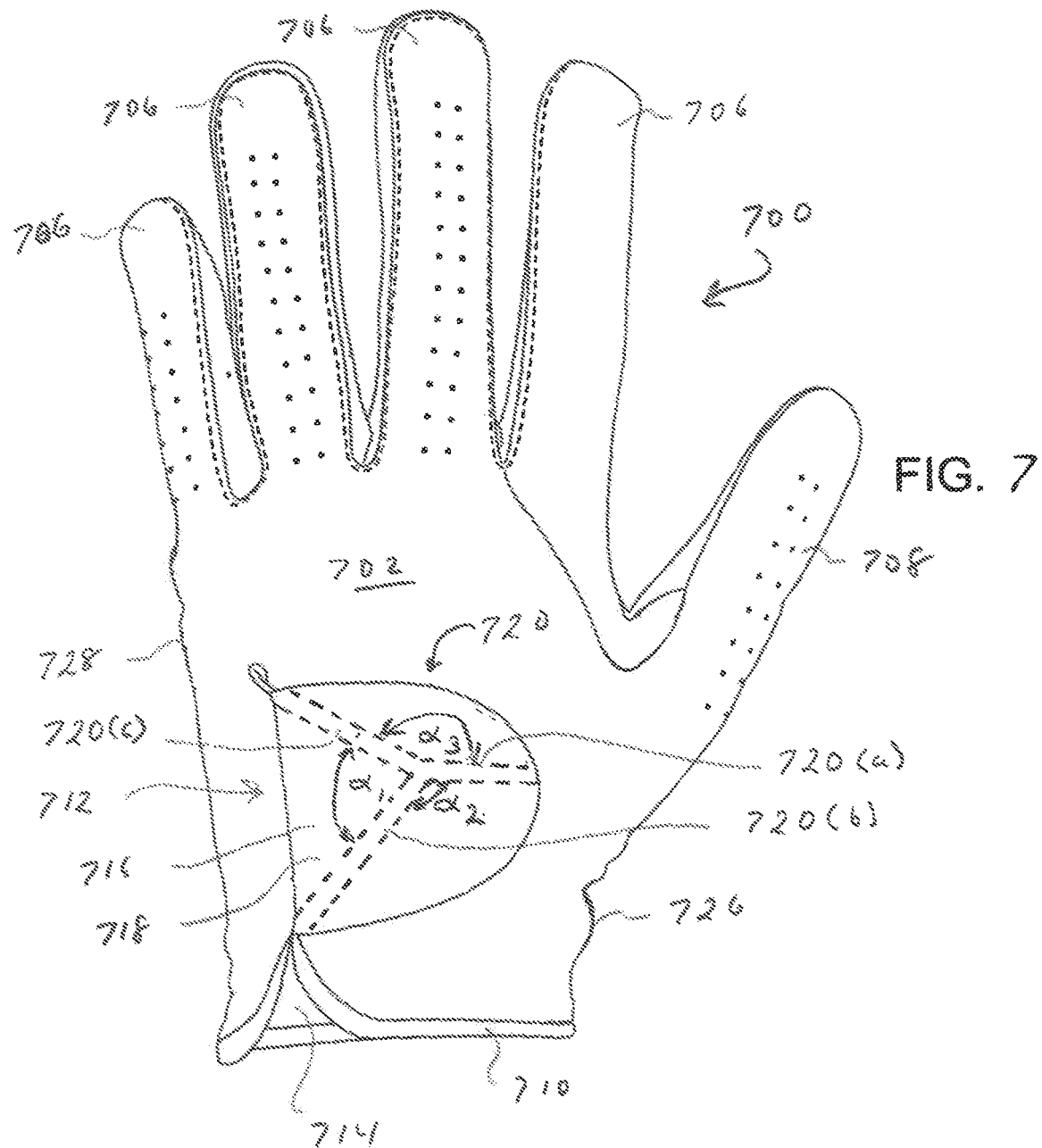
FIG. 7 illustrates a back view of a glove according to an embodiment of the present invention.

Referring to FIG. 7, a glove 700 is preferably comprised of a back portion 702 that covers a back portion of a user's hand, a palm portion (not shown) that covers a palm portion of a user's hand, finger portions 706 that cover one or more of the fingers of a user's hand, a thumb portion 708 that covers the thumb of a user's hand, a cuff portion 710 that surrounds a substantial portion of a user's wrist and a closure mechanism 712. The closure mechanism 712 extends across a slit 714 that extends from the cuff portion 710 toward the finger portions 706 and includes a flap 716 that closes the slit 714. When closed, the flap 716 is fastened to the opposing section of the glove back portion 702 to tighten and secure the glove 700 on the wearer's hand. Preferably, hook-and-loop fasteners such as Velcro® fasteners are used to lock the flap 716 in place. More particularly, the flap 716 has an outer surface 718 and interior (not shown) surface. Tiny hook/loop fasteners are coupled to the interior surface of the flap 716 and complementary hook/loop fasteners are arranged on the opposing section of the back portion 702 of the glove 700.

In this embodiment, the detectable mark 720 is comprised of a plurality of stripes 720(a), 720(b) and 720(c) located in the closure mechanism 712. Preferably, the detectable mark 720 is applied between the hook/fastener layer on the flap 716 and the outer surface 718 of the flap 716 such that the detectable mark 720 is not visible to the wearer. Stripe 720(a) extends from the thumb side of the flap 716 toward the pinky sides or the flap 716. Stripes 720(b) and 720(c) intersect the end of stripe 720(a) and extend toward the bottom portion and top portion of the flap 716, respectively. Preferably, stripes 720(b) and 720(c) intersect stripe 720(a) and form an angle α1 of between 30° and 90°. Each of the stripes 720(b) and 720(c) also form an angle α2 and α3 with stripe 720(a), respectively, of between about 90° and 150°. In a preferred embodiment, α1, α2 and α3 are different in order to assist a radar detector to determine the orientation of the user's hand throughout the swing. Moreover, stripes 720(a), 720(b) and 720(c) preferably have a length of about 0.5 inch and 2.5 inches, and more preferably, between about 1 inch and 2 inches. In a preferred embodiment, each of the stripes 720(a), 720(b) and 720(c) have different lengths in order to assist a radar detector to determine the orientation of the user's hand throughout the swing.

Figure 8:
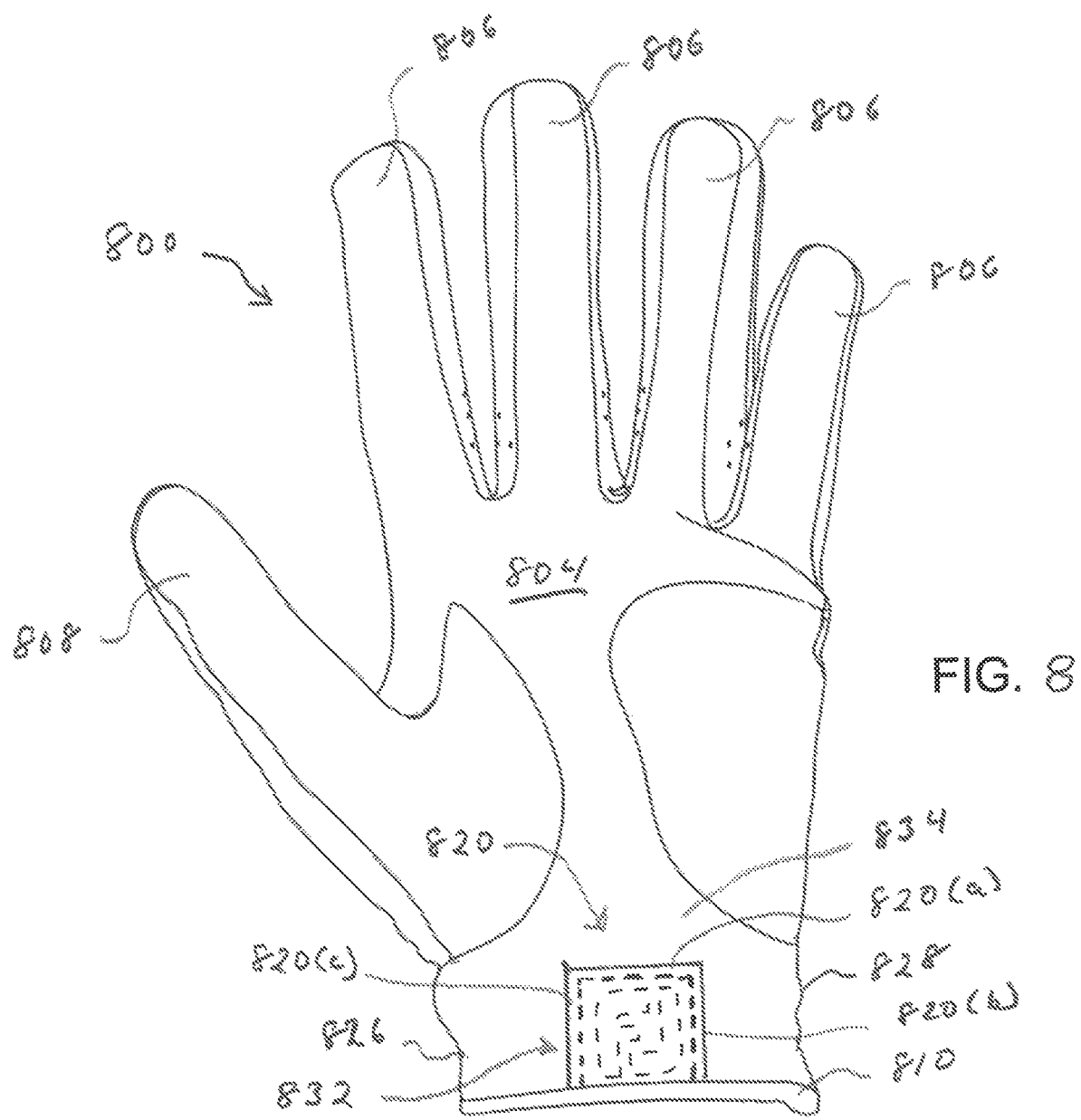
FIG. 8 illustrates a front view of a glove according to an embodiment of the present invention.

Referring to FIG. 8, a glove 800 is preferably comprised of a back portion (not shown) that covers a back portion of a user's hand, a palm portion 804 that covers a palm portion of a user's hand, finger portions 806 that cover one or more of the fingers of a user's hand, a thumb portion 808 that covers the thumb of a user's hand, a cuff portion 810 that surrounds a substantial portion of a user's wrist. The glove further includes a radar detectable mark 820 located adjacent to the cuff portion 810 on the palm portion 804 of the glove. In this embodiment, the detectable mark 820 is comprised of a plurality of stripes 820(a), 820(b) and 820(c) that can surround a logo 832 located on the palm portion 804, adjacent the cuff 810. Preferably, the detectable mark 820 is applied between the logo 832 and the outer surface 834 of the palm portion 804 such that the detectable mark 820 is not visible to the wearer. Preferably, the detectable mark 820 is applied on the inner surface the logo 832 or the outer surface 834 of the palm portion 804. Stripe 820(a) extends along a top edge portion of the logo 832 and stripes 820(b) and 820(c) extend along the side portions from the cuff portion 810 and intersect stripe 820(a). Preferably, stripes 820(b) and 820(c) intersect stripe 820(a) at an angle α of between 30° and 120°, and more preferably, between 75° and 105°. Each of the stripes 820(a), 820(b) and 820(c) are preferably about 0.25 inch to 2.5 inches, and more preferably, between about 0.5 inch and 2.5 inches. In a preferred embodiment, each of the stripes 820(a), 820(b) and 820(c) can have the same length or a different length in order to assist a radar detector to determine the orientation of the user's hand throughout the swing. Moreover, the embodiment discussed with respect to FIG. 8, or other radar detectable marks can be used on the palm portion 804 in conjunction with radar detectable marks located on the back portion of the glove (not shown) such as those discussed above with reference to FIGS. 1-7. In particular, a radar detectable mark located in the cuff 810 on the palm portion 804 or back portion (not shown) are particularly useful with the radar detectable mark 820 under a logo 832 on the palm portion 804.

In another particular aspect of this embodiment, the golf glove includes at least one additional radar detectable mark, each of the additional radar detectable mark(s) having a shape independently selected from irregular shapes and basic, regular shapes. Suitable examples of basic, regular shapes include, but are not limited to, circles, rings, crescents, squares, triangles, rectangles, chevrons, and other regular polygons, irregular polygons, and basic nonpolygonal shapes. It is also contemplated that any of the embodiments set forth above can be used in conjunction with radar detectable marks such as a plurality of dots located on the back portion of the finger portions. For example, the dots could be preferably between about 0.05 inch and 0.5 inch in diameter and can be the same or different diameters. In a particular embodiment, it is contemplated that each of the finger portions have one or more dots of between about 0.05 inch and 0.5 inch. In yet another embodiment, the pinky finger and ring finger each contain a radar detectable mark such as one or more dots.

In a particular embodiment, the radar detectable mark(s) have a total surface coverage of less than 20%, and greater than about 0.5%, of a total surface coverage of the back portion of the glove.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains. Moreover, the examples set forth above have been described with respect to golf gloves. However, it is clear that the technology discussed above can be used with baseball gloves, football gloves and the like.

What is claimed is:

1. A glove comprising a layer with a mark disposed on a surface thereof, wherein:
   the mark is formed from a radar detectable material; and
   the mark comprises two or more intersecting stripes.

2. The glove of claim 1, wherein the mark is formed of three or more intersecting stripes including a first stripe, a second stripe intersecting the first stripe at a first angle of between 30° and 120°, and a third stripe intersecting the first stripe at a second angle of between 30° and 120°.

3. The glove of claim 2, wherein the first angle and second angle are from 75° to 105°.

4. The glove of claim 1, wherein each of the intersecting stripes has a width of 0.2 inches or less.

5. The glove of claim 1, wherein the intersecting stripes include a first stripe and a second stripe, and wherein the first stripe has a first length of 0.25 inch to 2.5 inches and the second stripe has a second length of 0.25 inch to 2.5 inches.

6. The glove of claim 1, wherein intersecting stripes include a first stripe and a second stripe, and wherein the first stripe has a first length of from 0.5 inch and 2.5 inches and the second stripe has a second length of from 0.5 inch and 2.5 inches.

7. The glove of claim 1, wherein the mark is comprised of an electrically conductive ink comprising a base resin and an electrically conductive material.

8. The glove of claim 7, wherein the electrically conductive material is selected from the group consisting of silver, electrically conductive carbon, aluminum, graphene, nanotubes, nanometals, and combinations of two or more thereof.

9. The glove of claim 8, wherein the base resin is selected from the group consisting of vinyl polymers, urethane polymers, acrylic polymers, epoxy polymers, silicone polymers and combinations of two or more thereof.

10. The glove of claim 1, wherein the glove comprises a layer and the mark is disposed on an inner surface of the layer.

11. The glove of claim 1, wherein the glove comprises a layer and the mark is disposed on an outer surface of the layer.

12. The glove of claim 1, wherein the glove comprises an inner layer and an outer layer, and the mark is disposed between the inner layer and the outer layer.

13. The glove of claim 12, wherein the inner layer and outer layer form a glove closure mechanism on a back side of the glove.

14. The glove of claim 12, wherein the outer layer forms a logo attached to the closure mechanism of the glove.

15. A glove comprising a layer having a first radar detectable mark on a back side of the glove and a second radar detectable mark disposed on a palm side of the glove, wherein the first mark has a basic shape selected from the group consisting of circles, rings, crescents, squares, triangles, rectangles, chevrons, regular polygons, irregular polygons, and basic nonpolygonal shapes.

16. The glove of claim 15, wherein the second radar detectable mark comprises a plurality of intersecting stripes.

17. The glove of claim 16, wherein the plurality of intersecting stripes includes at least a first stripe, a second stripe intersecting the first stripe, and a third stripe intersecting the first stripe.

18. The glove of claim 17, wherein the glove has a cuff and the first stripe is located on the cuff.

19. The glove claim 17, wherein each of the plurality of intersecting stripes has a width of 0.2 inches or less.

20. A glove comprised of a back portion configured to cover a back portion of a user's hand, a palm portion configured to cover a palm portion of the user's hand, a plurality of finger portions configured to cover a plurality of fingers of the user's hand, a thumb portion configured to cover a thumb of the user's hand, and a cuff portion configured to surround a substantial portion of a wrist of the user, wherein a first radar detectable mark is disposed on a the back portion and a second radar detectable mark is disposed on the palm portion.

21. The glove of claim 20, wherein the glove is further comprised of a third radar detectable mark disposed on the cuff.

* * * * *